United States Patent [19]

Wrobel

[11] Patent Number: 5,479,460
[45] Date of Patent: Dec. 26, 1995

[54] METHOD FOR HANDLING EQUIPMENT

[75] Inventor: Edward L. Wrobel, Kennesaw, Ga.

[73] Assignee: Westinghouse Electric Corporation, Pittsburgh, Pa.

[21] Appl. No.: 189,389

[22] Filed: Jan. 31, 1994

Related U.S. Application Data

[62] Division of Ser. No. 991,765, Dec. 17, 1992, Pat. No. 5,305,358.

[51] Int. Cl.⁶ .............................. G21C 19/00; F16G 13/00
[52] U.S. Cl. ............................................................. 376/260
[58] Field of Search ..................................... 376/260, 463; 474/206–217; 59/84–92

[56] References Cited

U.S. PATENT DOCUMENTS 4,288,290 9/1981 Saima et al. ........................ 376/260

5,139,464 8/1992 Lehnert ................................ 474/155

*Primary Examiner*—Daniel D. Wasil
*Attorney, Agent, or Firm*—David G. Maire

[57] ABSTRACT

A method for moving equipment wherein a first chain which is free to bend in only one direction and a second chain which is free to bend in only one direction are positioned adjacent each other so that the two bend directions are opposed one another to form a rigid column. The equipment, which may include control rod drive handling equipment for a boiling water reactor, is attached to the rigid column. The equipment may be moved by moving the rigid column through a drive mechanism.

11 Claims, 9 Drawing Sheets

METHOD FOR HANDLING EQUIPMENT

This is a division of application Ser. No. 07/991,765 filed Dec. 17, 1992, now U.S. Pat. No. 5,305,358.

BACKGROUND OF THE INVENTION

This invention relates to the installation and removal of a control rod drive from a reactor vessel and, more particularly, to control rod drive handling equipment which utilizes a rigid chain configuration to move the control rod drive.

To remove the control rod drives from a boiling water reactor, the control rod drives are withdrawn from the reactor vessel through the bottom of the reactor vessel into the undervessel area of the boiling water reactor. The control rod drives are then removed from the undervessel area through control rod drive penetration access holes in the vessel support structure and in the drywell structure.

French patent application 2,573,832 filed Nov. 23, 1984 entitled "Thrust Chain", which is hereby incorporated by reference, discloses a chain having a plurality of links including a first side plate and a second side plate. Each side plate has a heel for bearing against an adjacent heel to provide a rigid chain, which may bend in only one direction.

Therefore, what is needed is an apparatus and method which utilizes an extendable rigid structure for handling the control rod drives.

SUMMARY OF THE INVENTION

An apparatus for removing and installing a control rod drive includes a first chain and a second chain each having a first end, a second end, and a plurality of links therebetween. The links have a pivotable portion and a rigid portion for allowing the first chain to bend in a single direction and the second chain to bend in a single direction. The rigid portion of the second chain is positioned adjacent to and contacts the rigid portion of the first chain for providing a rigid column.

The apparatus includes means for retaining the first end of the first chain and the first end of the second chain and a drive mechanism attached to the first and the second chain for drawing the first chain through the drive mechanism in a first direction and for drawing the second chain through the drive mechanism in a second direction, for moving the control rod drive.

The apparatus may also include at least one first, at least one second, and at least one third chain guide for supporting the first and second chains, at least one wheel attached to the second chain guide, and a plurality of pins positioned through apertures of adjacently positioned links of the first and the second chains.

A method for removing and installing a control rod drive in a boiling water reactor supported by a vessel support structure includes the steps of positioning a first chain adjacent to and contacting a second chain. The control rod drive handling equipment, including the first and the second chains, is introduced through an access hole in the vessel support structure.

The method includes moving the control rod drive handling equipment along a track positioned in an undervessel area of the boiling water reactor for aligning the control rod drive handling equipment with a control rod drive housing. The first and second chains of the control rod drive handling equipment are then moved through a drive mechanism for maneuvering the control rod drive in the undervessel area of the boiling water reactor.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides an apparatus and method which utilizes an extendable rigid chain for installing and removing a control rod drive for a boiling water reactor.

Figure 1:
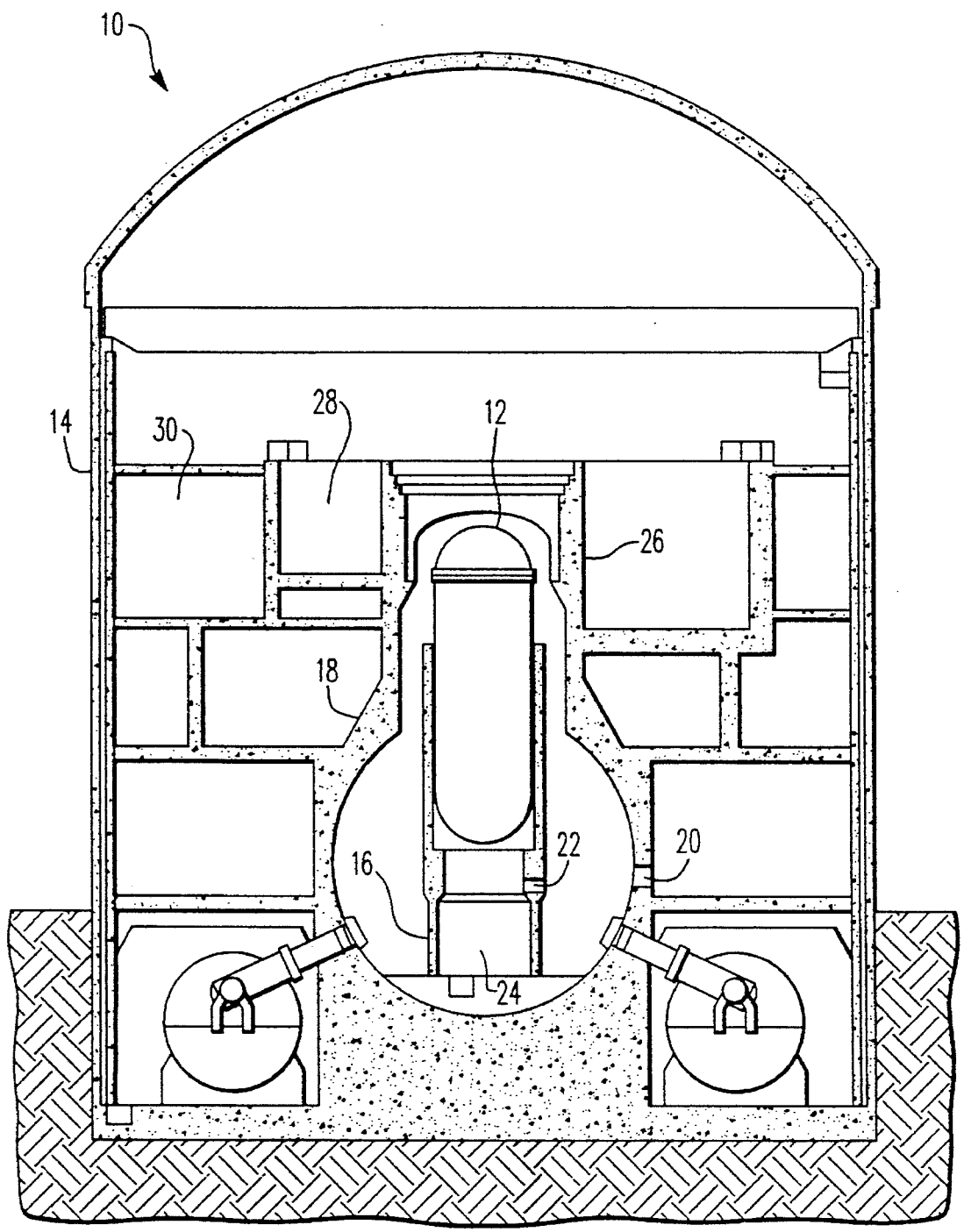
FIG. 1 is a schematic representation of a boiling water reactor.

Referring to FIG. 1, a nuclear power supply system 10 includes a reactor vessel 12, such as a boiling water reactor, which is housed-within a containment structure 14. The reactor vessel 12 is positioned on a vessel support structure 16. The reactor vessel 12 and the vessel support structure 16 are housed within a drywell structure 18 or primary containment. The drywell structure 18 has an access hole 20 and the vessel support structure 16 has an access hole 22 for providing an accessway to an undervessel area 24. The undervessel area 24 of the nuclear power supply system 10 is the area directly below the reactor vessel 12. Also, housed within the containment structure 14 is a fuel pool 26, a steam separator and dryer pool 28, and a plurality of cavities 30 for housing various pieces of equipment of the power supply system 10.

Figure 2:
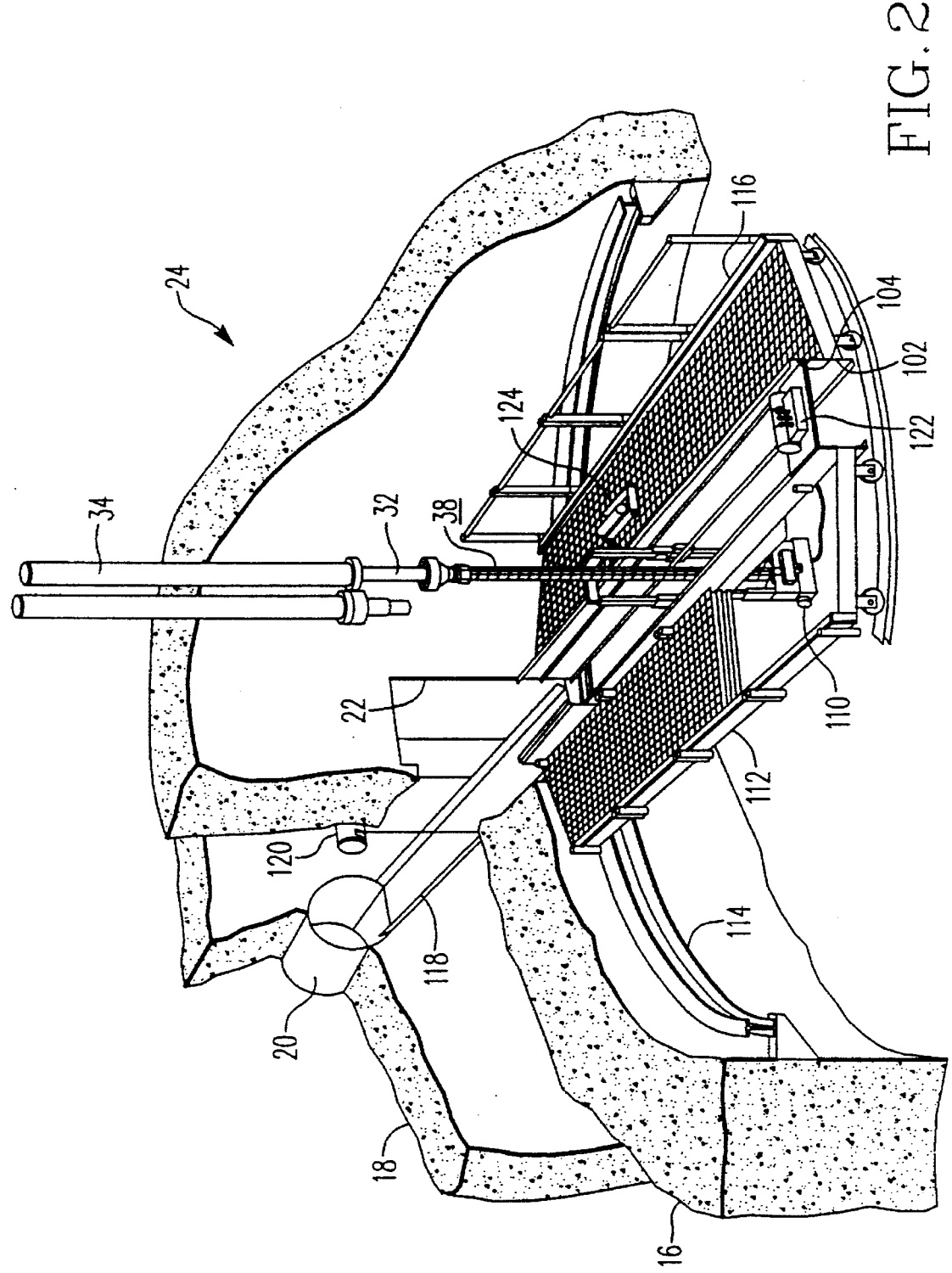
FIG. 2 is a isometric view of an undervessel area of a boiling water reactor including control rod drive handling equipment.
Figure 3A:
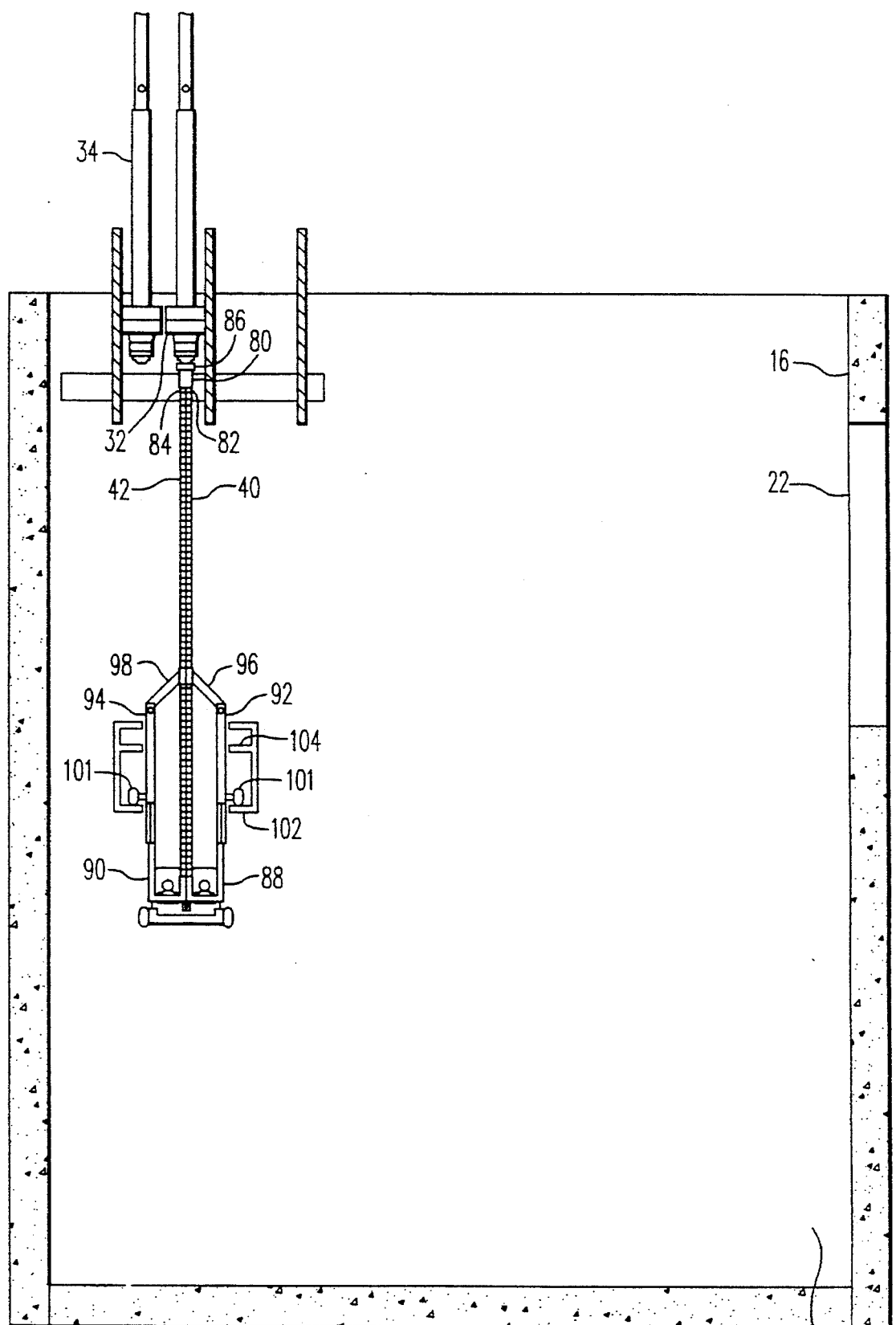
FIG. 3A is a schematic representation of the control rod drive handling equipment, including a first chain and a second chain, engaging a control rod drive in the undervessel area of the boiling water reactor.
Figure 3B:
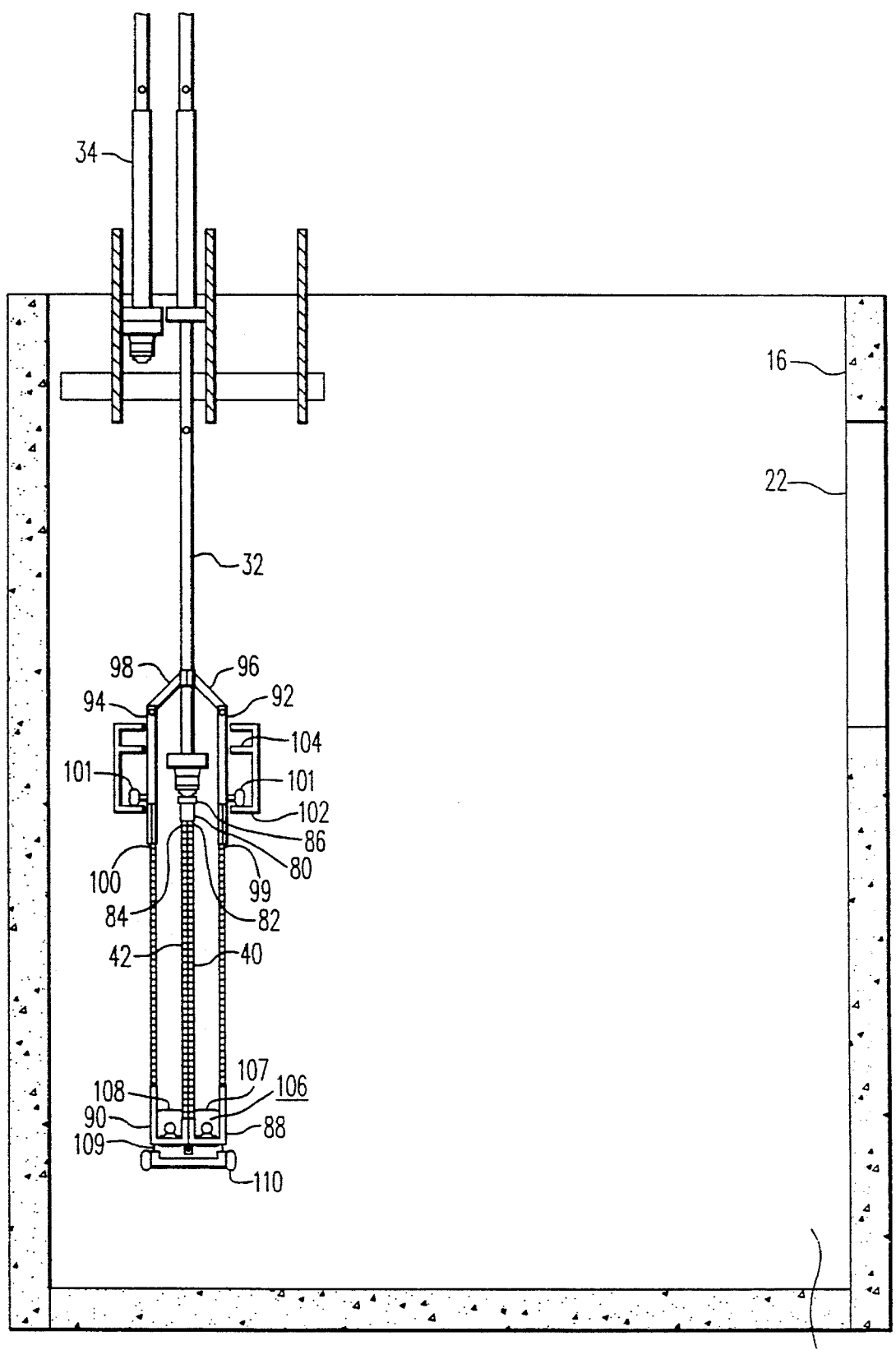
FIG. 3B is a schematic representation of the control rod drive handling equipment withdrawing the control rod drive from a control rod drive housing flange.
Figure 3C:
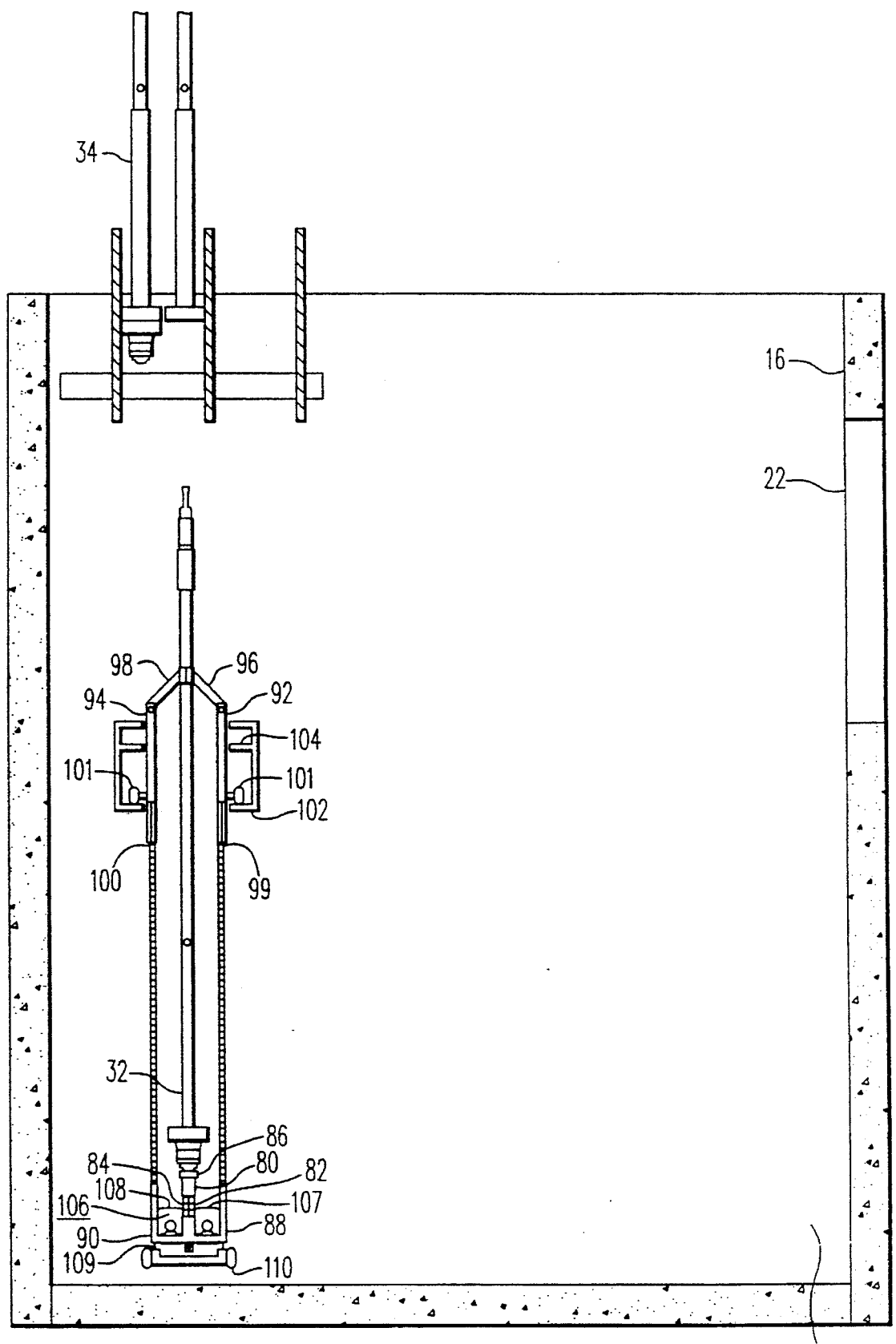
FIG. 3C is a schematic representation of the control rod drive handling equipment with the control rod drive removed from the control rod drive housing flange.

Referring to FIGS. 1–3, the reactor vessel 12 has a plurality of control rod drives 32 which extend through the bottom of the reactor vessel 12 into the undervessel area 24. The control rod drives 32 are housed within control rod drive housings 34.

Referring to FIGS. 3–7, control rod drive handling equipment 38 includes an extendable rigid structure, such as a first chain 40 and a second chain 42. As an example, the chain may be a chain capable of bearing a vertical force of approximately 5500 lb manufactured by Serapid France, as disclosed in French patent application 2,573,832. Each chain 40 and 42 has a plurality of links 44 and 46 which when connected together provide an extendable rigid column. Each of the links 44 and 46 include a first side plate 48 and a second side plate 50.

The first side plate 48 has a first portion or pivotable portion 54, which is a substantially oval portion, and a second portion or rigid portion, which is a heel 56. The first side plate 48 has a plurality of apertures 57. The heel 56, having a first edge 58 and a second edge 60, has a length which corresponds to the distance between the centers of the apertures 57 for bearing on corresponding edges of adjacent links. The pivotable portion 54 is offset from the heel 56 for allowing the chains 40 and 42 to bend in a single direction and to be rigid in an opposite direction.

The second side plate 50 has a first portion or rigid portion, which has a heel 62, and a second portion or pivotable portion 66, which is a substantially oval portion. The second side plate has a plurality of apertures 67. The heel 62, having a first edge 68 and a second edge 70, has a length which corresponds to the distance between the centers of the apertures 67 for bearing against corresponding edges of adjacent links. The pivotable portion 66 is offset from the heel 62 for allowing the chains 40 and 42 to bend in a single direction and to be rigid in an opposite direction.

When the chain is assembled, the side plates 48 and 50 are alternately positioned with respect to one another in a first row 72 and a second row 74. The two rows 72 and 74 are connected to one another through pins 76, positioned through the apertures 57 and 67, and rollers 78. When connected, the heel 56 of the first side plate 48 faces the heel 62 of the second side plate 50 or the oval portion of the first side plate 48 faces the oval portion of the second side plate 50. The second edge 60 of the first side plate 48 contacts the first edge 68 of the second side plate 50 for providing a rigid structure. The chain may bend in only one direction as the links pivot about the pins 76. The links 44 and 46 may be constructed of cadmium plated steel, the pins 76 may be constructed of series 400 stainless steel, and the rollers 78 may be constructed of carbon steel.

Figure 4:
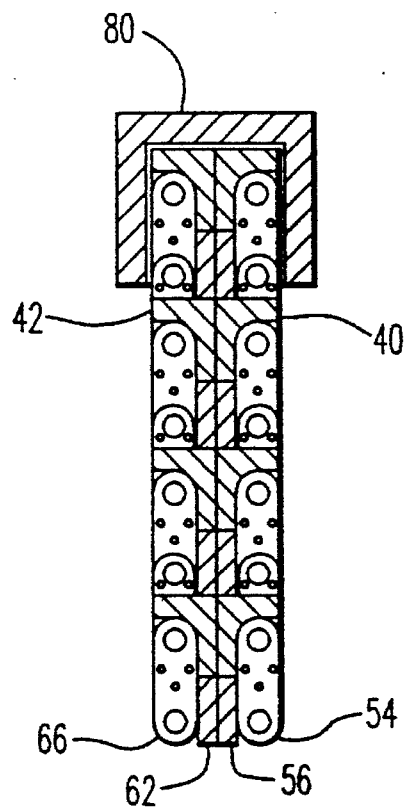
FIG. 4 is a detailed view of the first and the second chains positioned in a back to back configuration.
Figure 5:
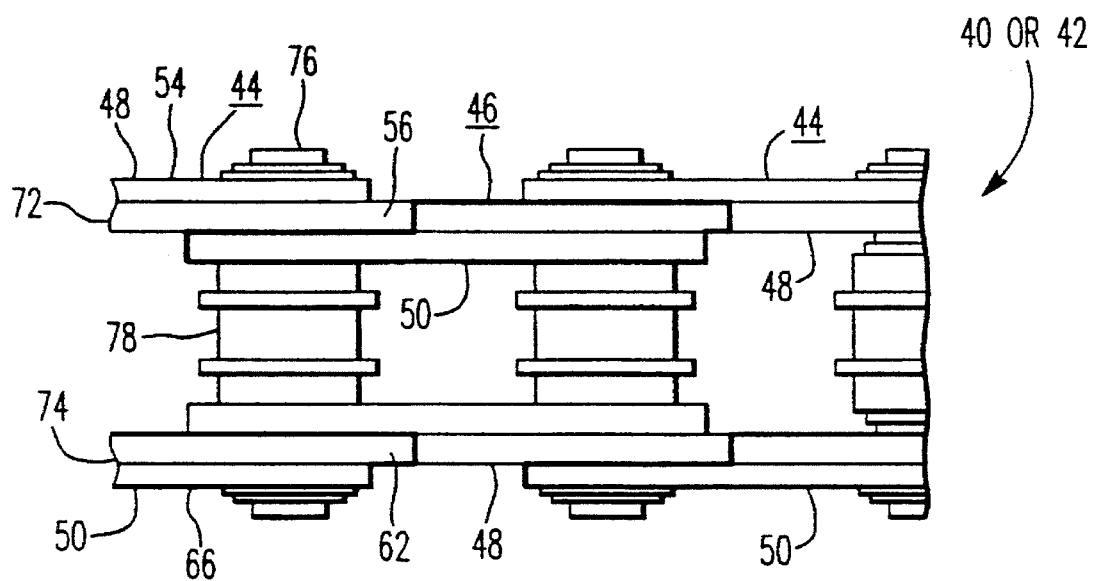
FIG. 5 is a top view of the chain including a plurality of links and side plates attached by pins and rollers.
Figure 6:
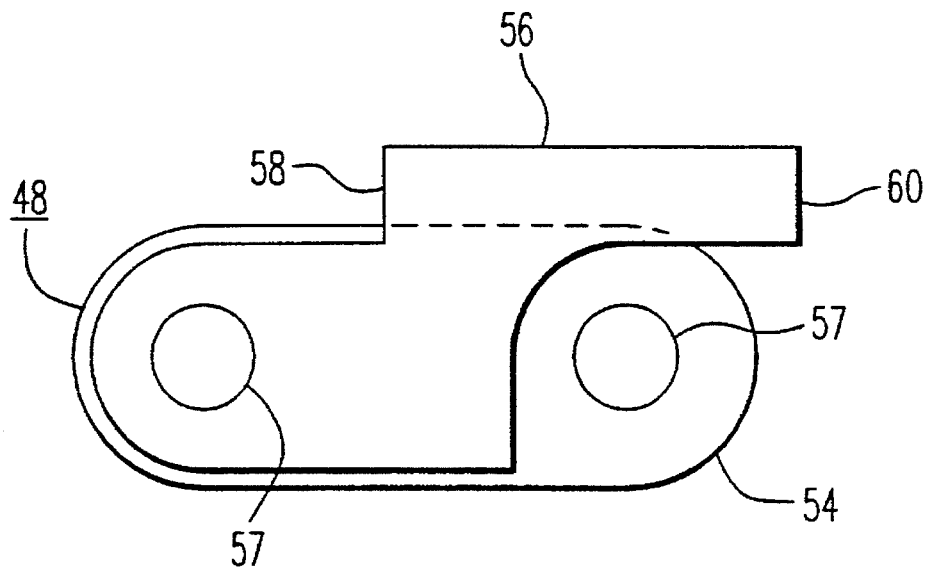
FIG. 6 is a side view of a first side plate.
Figure 7:
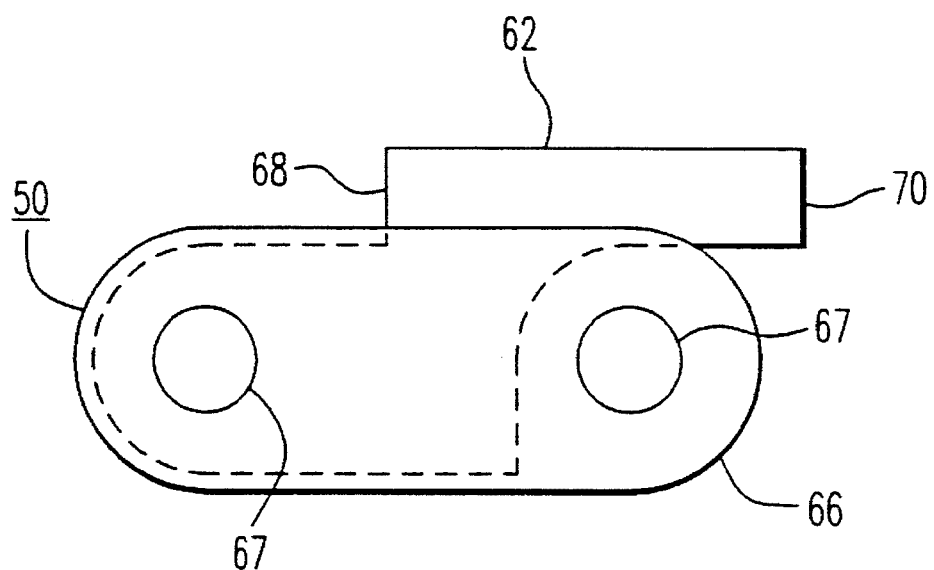
FIG. 7 is a side view of a second side plate.
Figure 8:
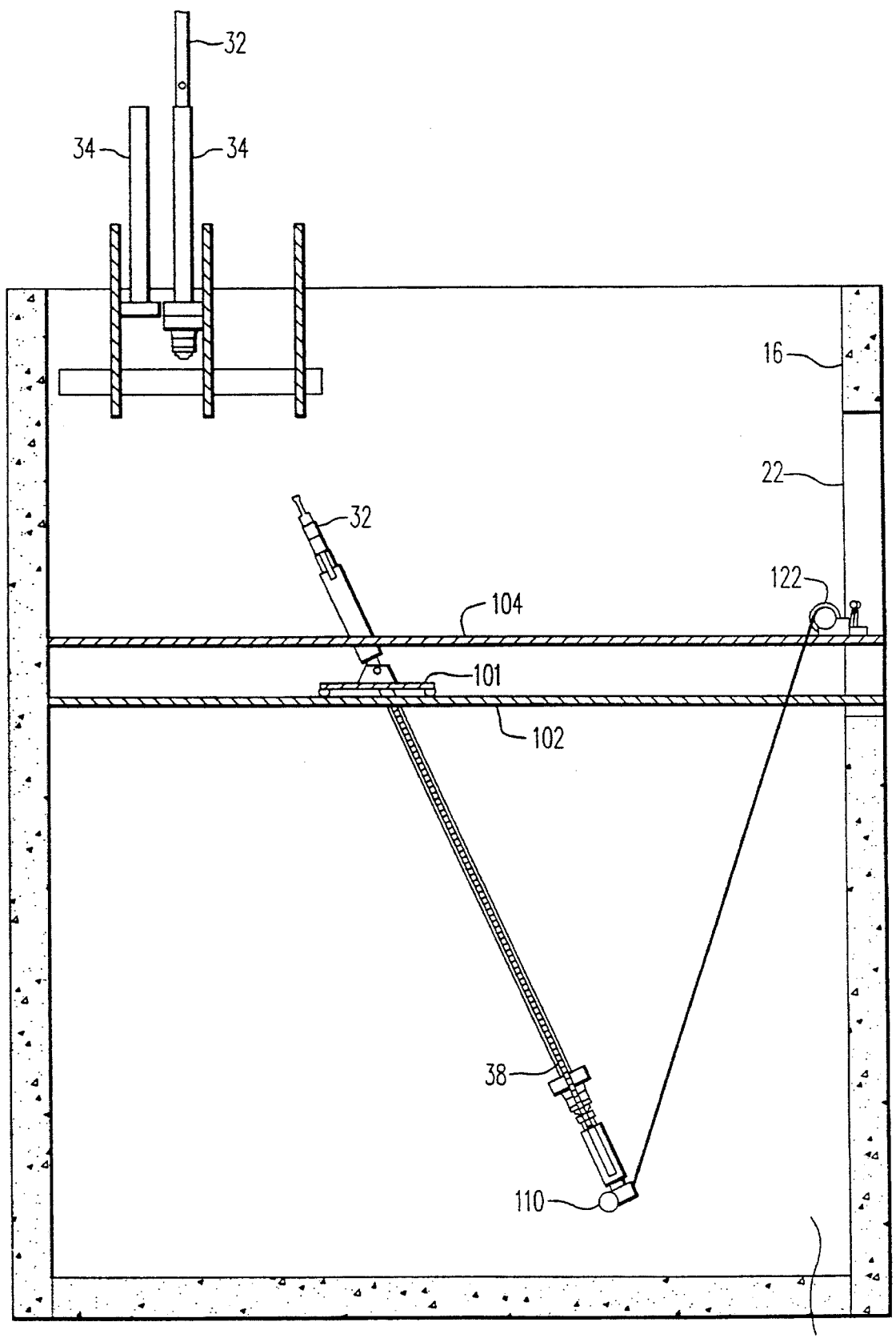
FIG. 8 is a schematic representation of the control rod drive attached to an upending hoist.
Figure 9:
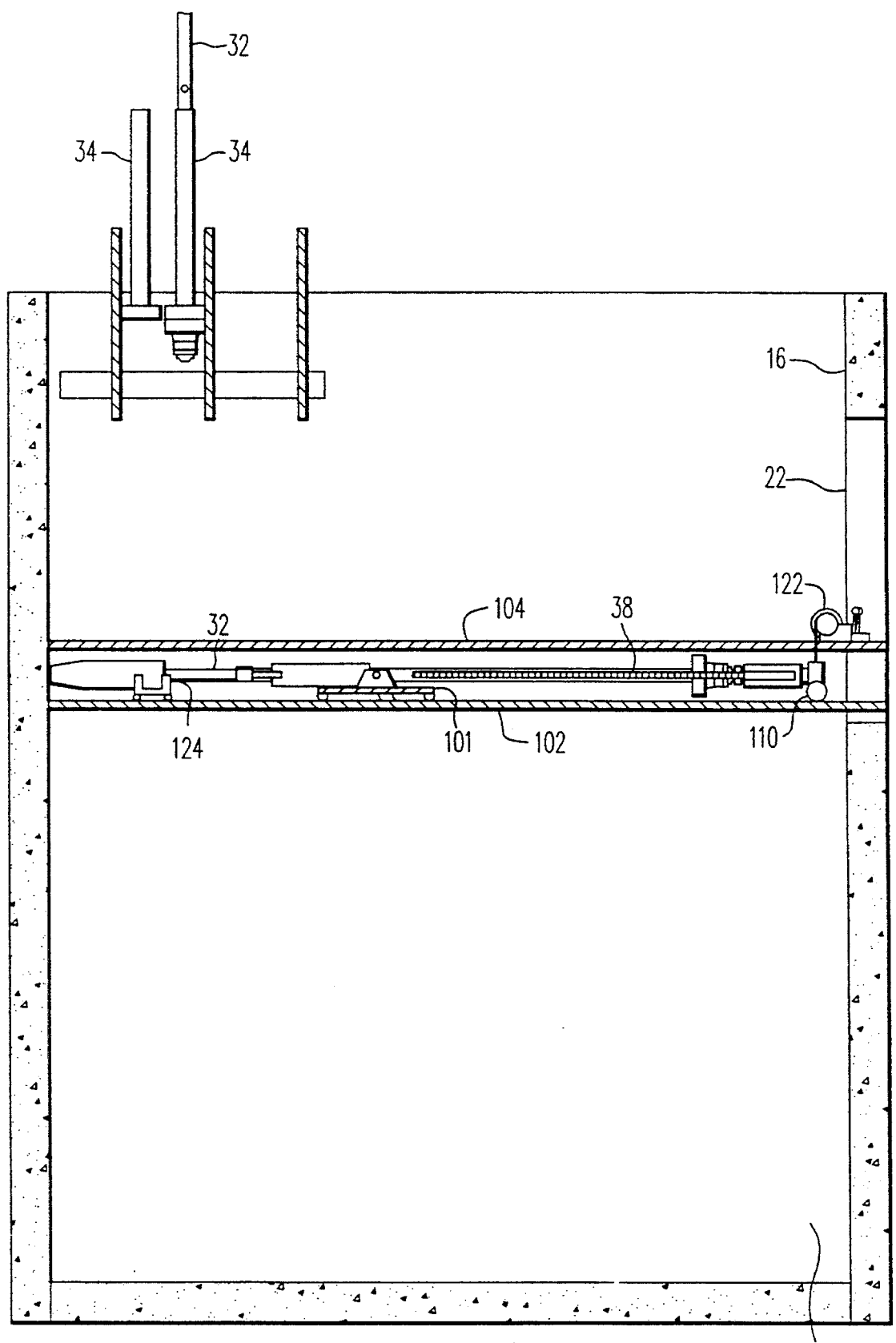
FIG. 9 is a schematic representation of the control rod drive supported by a lead cart and kick out wheels on a lower track positioned in the undervessel area of the boiling water reactor.

Still referring to FIGS. 3 and 4, the first chain 40 is positioned adjacent the second chain 42 in a manner so that the heels 56 and 62 of the first and second side plates 48 and 50 of the first chain 40 are positioned adjacent the heels 56 and 62 of the first and second side plates 48 and 50 of the second chain 42, thereby providing a rigid column. An end block 80 or retaining means is attached to the first ends 82 and 84 of the chains 40 and 42 for holding the chains 40 and 42 in the back to back configuration. The end block 80 has a mechanism 86 or engaging means which contacts the control rod drive 32 for installation and removal of the control rod drive 32 from the reactor vessel 12.

The chains 40 and 42 are supported by chain guides, such as first guides 88 and 90, second guides 92 and 94, and third guides 96 and 98. The first guides 88 and 90 direct the chains 40 and 42 to bend approximately 180° as the chains 40 and 42 move. The second guides 92 and 94 or retaining means are attached to the second ends 99 and 100 of the chains 40 and 42. Wheels 101 or alignment means are attached to the second guides 92 and 94 for engagement with a lower track 102 or an upper track 104, to be further described below. The third guides 96 and 98 are pivotally attached to the second guides 92 and 94. The third guides 96 and 98, which may be connected to the chains 40 and 42 for supporting the chains 40 and 42, may be pivoted away from the chains 40 and 42 to allow the control rod drive 32 to pass between the third guides 96 and 98.

The chains 40 and 42 may be moved by a drive mechanism 106, which includes a first drive 107 and a second drive 108. The drive mechanism 106 may be driven by an air motor 109, such as a 1000 lb air motor manufactured by Gardner Denver. Kick out wheels 110 are attached to the air motor 109 for guiding the movement of the control rod drive 32 within the reactor vessel 12.

Referring again to FIGS. 1–3, a transfer cart 112 moves along a track 114, which is attached to the vessel support structure 16 located in the undervessel area 24 of the nuclear power supply system 10. The transfer cart 112 supports an equipment platform 116. The transfer cart 112 has a control rod drive handling equipment track, which includes the lower track 102 and the upper track 104. The control rod drive handling equipment 38 may travel along either the lower track 102 or the upper track 104 to accommodate various types of nuclear reactors.

A leveling tray 118 is positioned on the transfer cart track 114 and through the access hole 22 of the vessel support structure 16 and the access hole 20 of the drywell structure 18. A leveling tray winch 120 is attached to the vessel support structure 16 for adjusting the position of the leveling tray 118 with respect to the transfer cart track 114 and the access hole 20 through the drywell structure 18.

An upending hoist 122 is positioned at one end of the transfer cart 112. A lead cart 124, positioned on the equipment platform 116 as illustrated in FIG. 3, may be positioned on an opposite end of the transfer cart 112.

In addition to utilizing the rigid chain configuration in the undervessel area 24, such as to remove the control rod drives 32 from the reactor vessel 12, the chains 40 and 42 may be used as an extendable vertical column, for various other applications within the containment structure 14, such as for working in the fuel pool 26 or other cavities 30 of the reactor vessel 12. The chains 40 and 42 may be used to position and handle various tools and components. The extendable vertical column may be used to reach any position required and allows for a controlled descent and ascent of any component or tooling.

OPERATION

Referring to FIGS. 2, 3, 8 and 9, the back to back positioned chains 40 and 42 are moved along the lower track 102 until the end block 80 is aligned with the control rod drive 32 to be removed. After the end block 80 is attached to the control rod drive 32, the drive mechanism 106 is activated to drive the chains 40 and 42, which lowers the control rod drive 32 from the control rod drive housing 34. The second guides 92 and 94 remains in a stationary position due to the wheels 101 being positioned within the lower track 102. As the drive mechanism 106 drives the chains 40 and 42, the ends of the chains 40 and 42 which are connected to the end block 80 move toward the drive mechanism 106. At least a portion of the links 44 and 46 positioned between the end block 80 and the first guides 88 and 90 make an approximately 180° turn through the first guides 88 and 90 and are then positioned between the first guides 88 and 90 and the second guides 92 and 94.

When the end of the control rod drive 32 which is attached to the end block 80 approaches the third guides 96 and 98, the third guides 96 and 98 are disengaged from the chains 40 and 42 to allow the control rod drive 32 to pass between the third guides 96 and 98. The third guides 96 and 98 are then used to support the control rod drive 32 as the control rod drive 32 continues to be withdrawn from the control rod drive housing flange 34.

After the control rod drive 32 is removed from the control rod drive housing, the upending hoist 122, which is attached to the control rod drive handling equipment 38 near the kick out wheels 110, raises the control rod drive 32 to a substantially horizontal position within the undervessel area 24. One end of the control rod drive is supported by the lead cart 124 and an opposite end of the control rod drive 32 is supported by the kick out wheels 110, which convey the control rod drive through the access hole 22 in the vessel support structure 16 and through the access hole 20 in the drywell structure 18 for removal of the control rod drive 32 from the reactor vessel 12.

The rigid chain design enables the control rod drive 32 and the chains 40 and 42 to be removed in a horizontal position without the need for additional supports on the chains. The rigid chains, in the horizontal position, may also be used as a transferable cart for removing equipment from the undervessel area 24.

To install a control rod drive 32 into the reactor vessel 12, above described steps are reversed.

Therefore, the invention provides an apparatus and method which utilizes an extendable rigid structure for handling a control rod drive within the primary or secondary containment of the boiling water reactor.

I claim:

1. Method for moving a control rod drive in a boiling water reactor having an undervessel area, the boiling water reactor being supported by a vessel support structure having an access hole, comprising the steps of:

positioning a first chain adjacent to and contacting a second chain in a manner to form a rigid structure;

introducing control rod drive handling equipment, including the first and the second chains through the access hole in the vessel support structure;

attaching the control rod drive handling equipment to the control rod drive; and moving the first and second chains of the control rod drive handling equipment through a drive mechanism for moving the control rod drive.

2. The method according to claim 1, further comprising the steps of:

pivoting the control rod drive handling equipment which includes the control rod drive to an approximately horizontal position; and maneuvering the approximately horizontally positioned control rod drive within the undervessel area by sliding the control rod handling equipment along a track in the undervessel area and through the access hole.

3. The method according to claim 1, wherein moving the first and second chains of the control rod drive handling equipment, comprises the steps of:

moving a portion of the first chain positioned between the control rod drive and the drive mechanism through the drive mechanism;

moving a portion of the second chain positioned between the control rod drive and the drive mechanism through the drive mechanism as the first chain moves through the drive mechanism;

bending the first chain in a first direction as the first chain progresses through the drive mechanism; and bending the second chain in a second direction as the second chain progresses through the drive mechanism.

4. The method according to claim 1, further comprising the step of supporting each end of the first and the second chains.

5. A method of moving equipment comprising the steps of:

providing a first chain having a plurality of links which are free to bend in only one direction;

providing a second chain having a plurality of links which are free to bend in only one direction;

positioning at least a portion of said first and second chains adjacent each other in a back to back configuration to form a rigid column wherein the bend direction of said first chain is substantially opposed the bend direction of said second chain;

attaching said equipment to said rigid column;

attaching a drive mechanism to said first and said second chains;

operating said drive mechanism to move said rigid column and said equipment.

6. A method for creating an extendable rigid column comprising the steps of:

providing a first chain having a plurality of links which are free to bend in only one direction;

providing a second chain having a plurality of links which are free to bend in only one direction;

attaching a drive mechanism to said first and second chains;

operating said drive mechanism to position a link of said first chain and a link of said second chain into a back to back configuration thereby providing a rigid column;

continuing to operate said drive mechanism to extend the length of said rigid column.

7. The method of claim 6, further comprising the step of attaching an end block to the ends of said first and second chains for holding said chains in the back to back configuration.

8. The method of claim 6, further comprising the step of attaching a piece of equipment to said rigid column so that the operation of said drive mechanism functions to move said equipment in a first direction.

9. The method of claim 8, further comprising the step of reversing the direction of operation of said drive mechanism to move said equipment in a second direction.

10. A process comprising the steps of:

providing a first chain which is free to bend in a single first direction;

providing a second chain which is free to bend in a single second direction;

positioning at least a portion of said first and said second chains adjacent each other whereby said first bend direction and said second bend direction are in substantial opposition thereby forming a rigid assembly;

attaching equipment to said rigid assembly.

11. A process comprising the steps of:

providing a first means for linking which is free to bend in a single first direction;

providing a second means for linking which is free to bend in a single second direction;

positioning at least a portion of said first and said second means for linking adjacent each other whereby said first bend direction and said second bend direction are in substantial opposition thereby forming a rigid assembly;

attaching equipment to said rigid assembly.

* * * * *